US010728860B2

(12) United States Patent
Lee

(10) Patent No.: US 10,728,860 B2
(45) Date of Patent: Jul. 28, 2020

(54) DEVICE AND METHOD OF HANDLING POWER HEADROOM REPORT FOR MULTIPLE TIME INTERVALS

(71) Applicant: ACER INCORPORATED, New Taipei (TW)

(72) Inventor: Chien-Min Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 15/660,962

(22) Filed: Jul. 27, 2017

(65) Prior Publication Data
US 2018/0035394 A1 Feb. 1, 2018

Related U.S. Application Data

(60) Provisional application No. 62/368,188, filed on Jul. 29, 2016.

(51) Int. Cl.
H04W 52/36 (2009.01)
H04W 52/40 (2009.01)
(Continued)

(52) U.S. Cl.
CPC ......... *H04W 52/365* (2013.01); *H04W 24/10* (2013.01); *H04W 52/146* (2013.01); *H04W 52/225* (2013.01); *H04W 52/40* (2013.01)

(58) Field of Classification Search
CPC ... H04W 52/365; H04W 52/36; H04W 52/30; H04W 52/18; H04W 52/04; H04W 52/40;
(Continued)

(56) References Cited

U.S. PATENT DOCUMENTS 8,687,541 B2 4/2014 Löhr
8,737,333 B2 * 5/2014 Chen ................... H04W 52/365
370/252
(Continued)

FOREIGN PATENT DOCUMENTS

CN 102118787 A 7/2011
CN 102893679 A 1/2013
(Continued)

OTHER PUBLICATIONS

MediaTek, Per UE PHR for carrier aggregation, 3GPP TSG-RAN WG1 Meeting #61bis, R1-103743, Dresden, Germany, Jun. 28-Jul. 2nd, 2010, pp. 1-4.
(Continued)

Primary Examiner — Jeffrey M Rutkowski
Assistant Examiner — Luna Weissberger
(74) Attorney, Agent, or Firm — Winston Hsu

(57) ABSTRACT

A communication device for handling a power headroom report (PHR) for multiple time intervals comprises a storage device for storing instructions and a processing circuit coupled to the storage device. The processing circuit is configured to execute the instructions stored in the storage device. The instructions comprise determining a PHR for a plurality of time intervals in a time interval according to a PH level of one of the plurality of time intervals, wherein the plurality of time intervals comprises at least one scheduled time interval; and transmitting the PHR to a network.

21 Claims, 7 Drawing Sheets

(51) Int. Cl.
*H04W 24/10* (2009.01)
*H04W 52/22* (2009.01)
*H04W 52/14* (2009.01)

(58) Field of Classification Search
CPC ... H04W 52/38; H04W 52/146; H04W 52/14; H04W 52/06; H04W 52/225; H04W 52/22; H04W 24/10
USPC .......................................................... 370/241
See application file for complete search history.

(56) References Cited

U.S. PATENT DOCUMENTS

| | | | |
|---|---|---|---|
| 2007/0149238 A1* | 6/2007 | Das | H04W 52/146 455/522 |
| 2013/0070611 A1 | 3/2013 | Ahn | |
| 2013/0324182 A1* | 12/2013 | Deng | H04W 52/281 455/522 |
| 2014/0023010 A1 | 1/2014 | Loehr | |
| 2014/0056278 A1* | 2/2014 | Marinier | H04W 72/044 370/330 |
| 2014/0369324 A1 | 12/2014 | Lin | |
| 2015/0036668 A1 | 2/2015 | Kanamarlapudi | |
| 2015/0215943 A1* | 7/2015 | Vajapeyam | H04W 72/0473 370/329 |
| 2015/0350944 A1 | 12/2015 | Chen | |
| 2016/0081044 A1 | 3/2016 | Wang | |
| 2016/0128095 A1 | 5/2016 | Damnjanovic | |
| 2016/0198421 A1* | 7/2016 | Yi | H05K 999/99 370/329 |
| 2016/0205631 A1 | 7/2016 | Chen | |
| 2016/0255593 A1 | 9/2016 | Blankenship | |

FOREIGN PATENT DOCUMENTS

| | | |
|---|---|---|
| CN | 104067683 A | 9/2014 |
| CN | 105407524 A | 3/2016 |
| CN | 105519210 A | 4/2016 |
| EP | 3 001 720 A1 | 3/2016 |
| EP | 3 142 427 A1 | 3/2017 |
| EP | 3 169 117 A1 | 5/2017 |
| WO | 2015/041406 A1 | 3/2015 |
| WO | 2015/068039 A2 | 5/2015 |
| WO | 2015093768 A1 | 6/2015 |
| WO | 2015/141747 A1 | 9/2015 |
| WO | 2015139032 A1 | 9/2015 |
| WO | 2015170725 A1 | 11/2015 |
| WO | 2016006681 A1 | 1/2016 |
| WO | WO-2017079530 A1 * | 5/2017 ........ H04W 72/1242 |

OTHER PUBLICATIONS

MediaTek Inc., Views on per UE PHR, 3GPP TSG-RAN WG1 Meeting #62, R1-104545, Madrid, Spain, Aug. 23-27, 2010, pp. 1-3.
Huawei, Power Headroom Report Enhancement for CA, 3GPP TSG RAN WG1 meeting #62, R1-104493, Madrid, Spain, Aug. 23-27, 2010, pp. 1-3.

* cited by examiner

DEVICE AND METHOD OF HANDLING POWER HEADROOM REPORT FOR MULTIPLE TIME INTERVALS

CROSS REFERENCE TO RELATED APPLICATIONS

This application claims the benefit of U.S. Provisional Application No. 62/368,188 filed on Jul. 29, 2016, which is incorporated herein by reference.

BACKGROUND OF THE INVENTION

1. Field of the Invention

The present invention relates to a communication device and a method used in a wireless communication system, and more particularly, to a communication device and a method of handling a power headroom report for multiple time intervals in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

A shortened transmission time interval (TTI) is proposed to improved transmission efficiency. However, the shortened TTI may coexist with a legacy TTI (i.e., normal TTI). That is, a UE may perform transmissions via both the shortened TTI and the legacy TTI. Transmission of a power headroom report in the art is developed only for the legacy TTI, and cannot be applied to TTIs with multiple types (e.g., lengths). Thus, how to handle the power headroom report for the TTIs is an important problem to be solved.

SUMMARY OF THE INVENTION

The present invention therefore provides a method and related communication device for handling a power headroom report for multiple time intervals to solve the above-mentioned problem.

A communication device for handling a power headroom report (PHR) for multiple time intervals comprises a storage device for storing instructions and a processing circuit coupled to the storage device. The processing circuit is configured to execute the instructions stored in the storage device. The instructions comprise determining a PHR for a plurality of time intervals in a time interval according to a PH level of one of the plurality of time intervals, wherein the plurality of time intervals comprises at least one scheduled time interval; and transmitting the PHR to a network.

A communication device for handling a power headroom report (PHR) for multiple time intervals comprises a storage device for storing instructions and a processing circuit coupled to the storage device. The processing circuit is configured to execute the instructions stored in the storage device. The instructions comprise determining a first PHR for at least one first time interval in a time interval according to at least one first PH level of the at least one first time interval, wherein the at least one first time interval comprises at least one first scheduled time interval; and determining a second PHR for at least one second time interval in the time interval according to at least one second PH level of the at least one second time interval, wherein the at least one second time interval comprises at least one second time interval; and transmitting the first PHR and the second PHR to a network.

A communication device for handling a power headroom report (PHR) for multiple time intervals comprises a storage device for storing instructions and a processing circuit coupled to the storage device. The processing circuit is configured to execute the instructions stored in the storage device. The instructions comprise determining a PHR for a first time interval of at least one first serving cell according to at least one PH level of the at least one serving cell, wherein the communication device is configured with at least one second time interval of at least one second serving cell; and transmitting the PHR to a network via one of the at least one serving cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
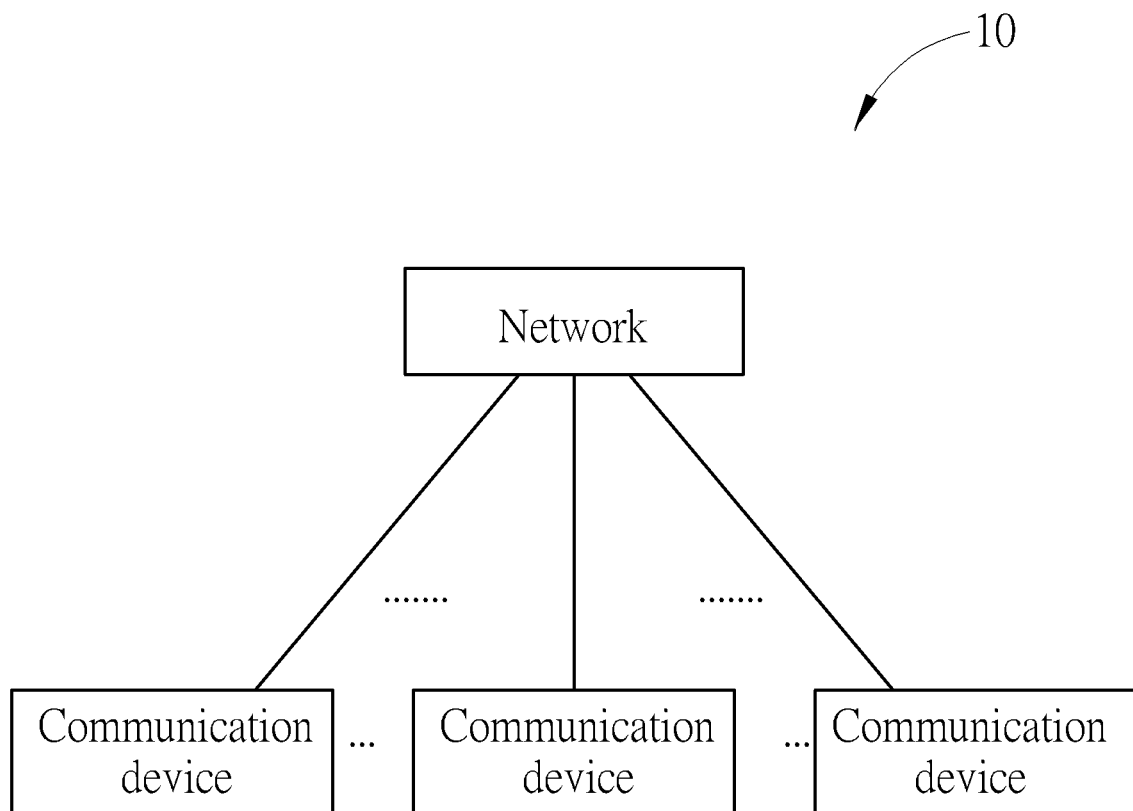
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier (s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NR-RAN) including at least one eNB and/or at least one next generation NB (gNB).

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN/NG-RAN and decisions corresponding to the information are made at the UTRAN/E-UTRAN/NG-RAN. Alternatively, the UTRAN/E-UTRAN/NG-RAN may forward the information to the core network, and the decisions corresponding to the information are made at the core network after the core network processes the information. In addition, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
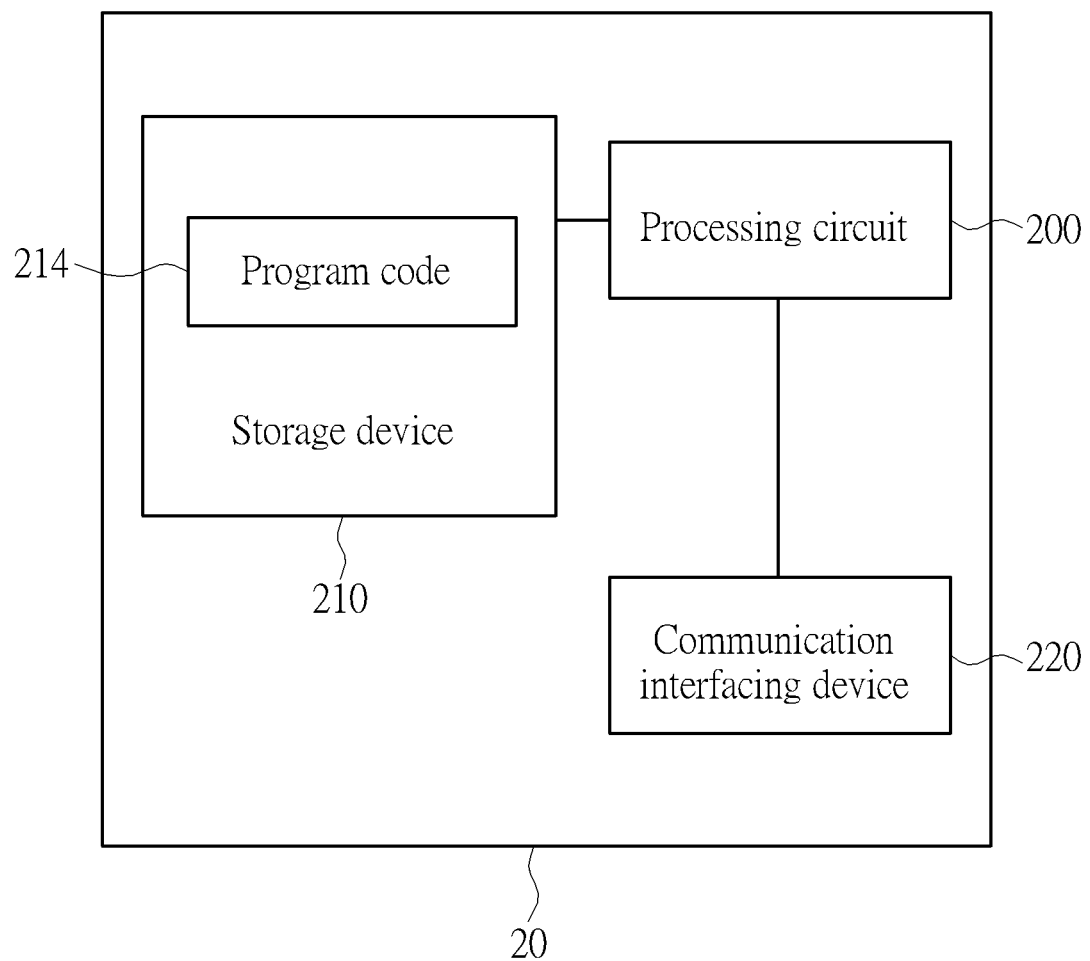
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

Figure 3:
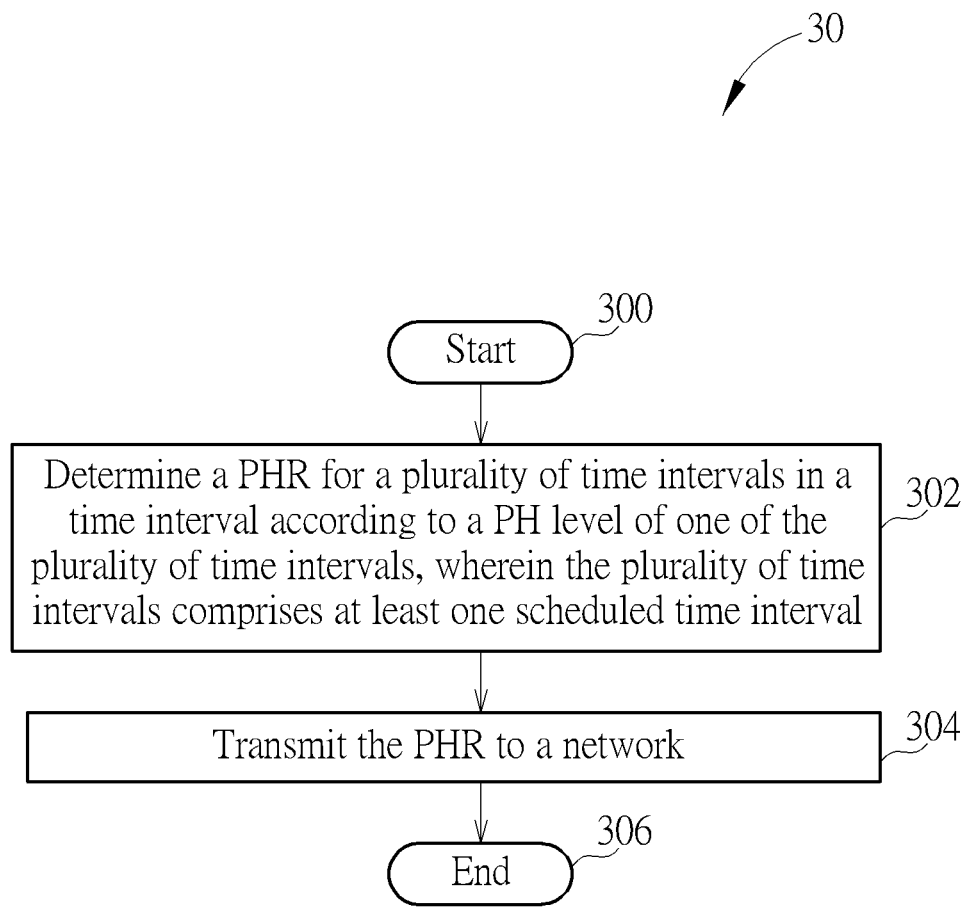
FIG. 3 is a flowchart of a process according to an example of the present invention.

FIG. 3 is a flowchart of a process 30 according to an example of the present invention. The process 30 may be utilized in a communication device shown in FIG. 1, to handle a power headroom report (PHR) for multiple time intervals. The process 30 may be compiled into the program code 214 and includes the following steps:

Step 300: Start.

Step 302: Determine a PHR for a plurality of time intervals in a time interval according to a PH level of one of the plurality of time intervals, wherein the plurality of time intervals comprises at least one scheduled time interval.

Step 304: Transmit the PHR to a network.

Step 306: End.

According to the process 30, the communication device determines a PHR for a plurality of time intervals (e.g., shortened time intervals) in a time interval (e.g., normal time interval) according to a PH level of one of the plurality of time intervals. The plurality of time intervals may or may not comprise at least one scheduled time interval. For example, the PHR includes the PH level. That is, part or all of the time intervals are scheduled for UL transmissions. Then, the communication device transmits the PHR (e.g., including the PH level) to a network. That is, (e.g., only) one PH level is used for reporting the PHR to the network to solve the problem in the art.

Realization of the process 30 is not limited to the above description. The following examples may be applied for realizing the process 30.

In one example, the one of the plurality of time intervals is a first scheduled time interval of the at least one scheduled time interval. That is, the PHR is determined according to the PH level of the foremost scheduled time interval. In one example, the one of the plurality of time intervals is a last scheduled time interval of the at least one scheduled time interval. That is, the PHR is determined according to the PH level of the tail scheduled time interval. In one example, the one of the plurality of time intervals is predetermined in the communication device. That is, the PHR is determined according to the PH level of the predetermined (e.g., preconfigured, configured) time interval. In one example, the one of the plurality of time intervals is a first time interval of the plurality of time intervals. In one example, the one of the plurality of time intervals is a last time interval of the plurality of time intervals.

In one example, the PH level of the one of the plurality of time intervals is lowest in at least one PH level of the at least one scheduled time interval. That is, the PHR is determined according to the lowest scheduled PH level. In one example, the PH level of the one of the plurality of time intervals is highest in at least one PH level of the at least one scheduled time interval. That is, the PHR is determined according to the highest scheduled PH level. In one example, the PH level of the one of the plurality of time intervals is lowest in a plurality of PH levels of the plurality of time intervals. That is, the PHR is determined according to the lowest PH level. In one example, the PH level of the one of the plurality of time intervals is highest in the plurality of PH levels of the plurality of time intervals. That is, the PHR is determined according to the highest PH level. In one example, the PHR is determined according to an average of at least one PH level of the at least one scheduled time interval. That is, only scheduled time intervals are included. In one example, the PHR is determined according to an average of a plurality of PH levels of the plurality of time intervals. That is, all time intervals are included.

In one example, the communication device transmits the PHR and an index of the one of the plurality of time intervals to the network. In one example, the communication device transmits the PHR in the time interval to the network. In one example, the communication device transmits the PHR in one of the at least one scheduled time interval. Further, a length of the one of the at least one scheduled time interval is shorter than at least one length of the rest of the at least one scheduled time interval.

In one example, the time interval is for performing at least one UL transmission via a first cell, and the plurality of time intervals are for performing a plurality of UL transmissions via at least one second cell. Further, the at least one second cell belongs to at least one BS of the network. In one example, the time interval is for performing at least one UL transmission via a first radio access technology (RAT), and the plurality of time intervals are for performing a plurality of UL transmissions via a second RAT. In one example, a plurality of lengths of the plurality of time intervals are the same. In one example, each of a plurality of lengths of the plurality of time intervals are not greater than a half length of the time interval.

Figure 4:
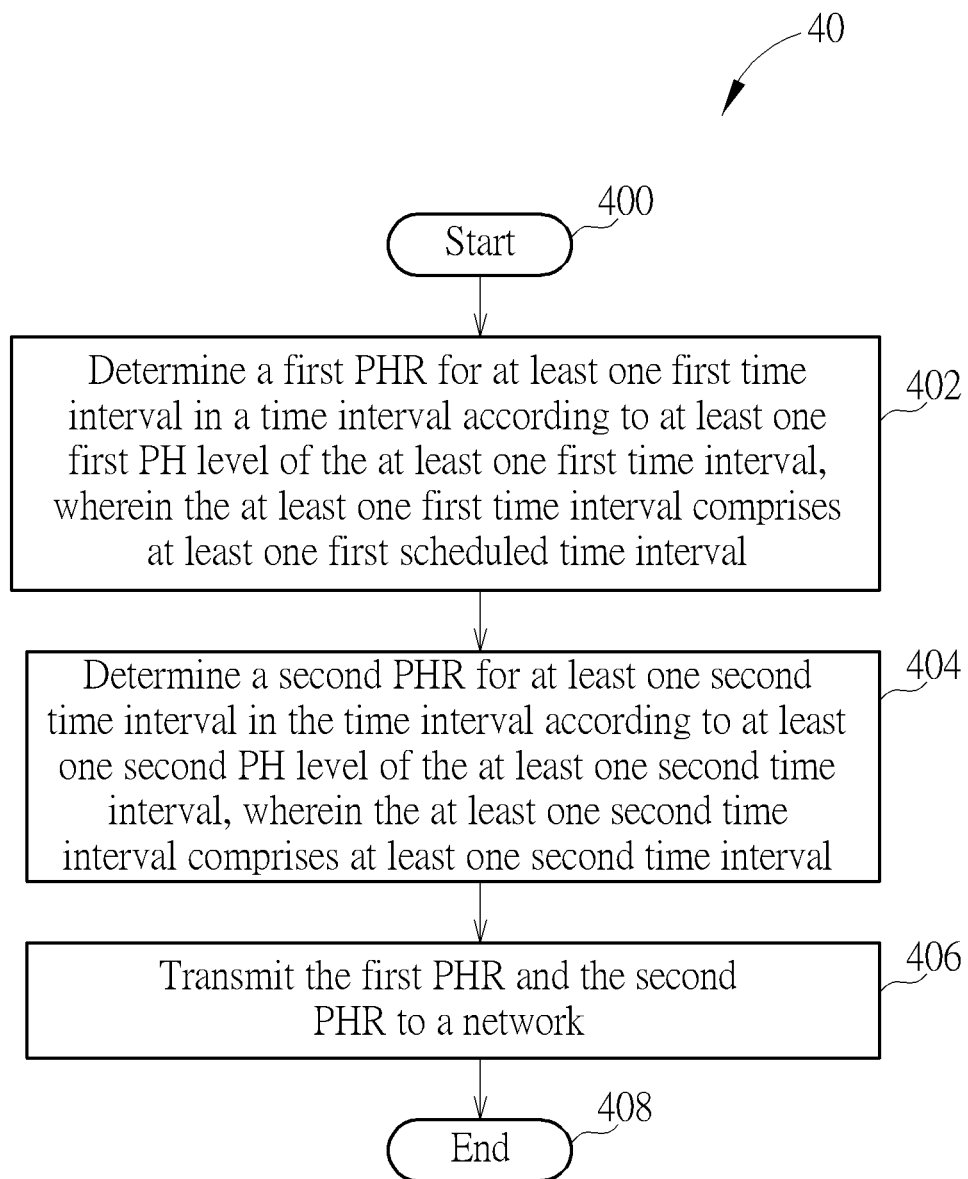
FIG. 4 is a flowchart of a process according to an example of the present invention.

FIG. 4 is a flowchart of a process 40 according to an example of the present invention. The process 40 may be utilized in a communication device shown in FIG. 1, to handle a PHR for multiple time intervals. The process 40 may be compiled into the program code 214 and includes the following steps:

Step 400: Start.

Step 402: Determine a first PHR for at least one first time interval in a time interval according to at least one first PH level of the at least one first time interval, wherein the at least one first time interval comprises at least one first scheduled time interval.

Step 404: Determine a second PHR for at least one second time interval in the time interval according to at least one second PH level of the at least one second time interval, wherein the at least one second time interval comprises at least one second scheduled time interval.

Step 406: Transmit the first PHR and the second PHR to a network.

Step 408: End.

According to the process 40, the communication device determines a first PHR for at least one first time interval in a time interval according to at least one first PH level of the at least one first time interval. The at least one first time interval may or may not comprise at least one first scheduled time interval. The communication device determines a second PHR for at least one second time interval in the time interval according to at least one second PH level of the at least one second time interval. The at least one second time interval may or may not comprise at least one second scheduled time interval. Then, the communication device transmits the first PHR (e.g., including the at least one first PH level) and the second PHR (e.g., including the at least one second PH level) to a network. For example, the first PHR includes the at least one first PH level, and the second PHR includes the at least one second PH level. That is, multiple PH levels are used for reporting the PHRs to the network to solve the problem in the art.

Realization of the process 40 is not limited to the above description. The following examples may be applied for realizing the process 40.

In one example, the communication device transmits the first PHR and the second PHR in one of the at least one first scheduled time interval to the network. Further, a length of each of the at least one first time interval is shorter than a length of each of the at least one second time interval. That is, a shorter time interval is used for transmitting the PHRs. In one example, the communication device transmits the first PHR in one of the at least one first scheduled time interval to the network, and transmits the second PHR in one of the at least one second scheduled time interval to the network. That is, the PHRs are transmitted in the respective time intervals.

In one example, the at least one first time interval and the at least one second time interval are for performing a plurality of UL transmissions via a cell. In one example, the at least one first time interval is for performing at least one first UL transmission via at least one first cell, and the at least one second time interval is for performing at least one second UL transmission via at least one second cell. Further, the at least one first cell belongs to a first cell group according to at least one length of the at least one first time interval, and the second cell belongs to a second cell group according to at least one length of the at least one second time interval. In one example, the at least one first cell and the at least one second cell belong to a cell group according to a plurality of lengths of the at least one first time interval and the at least one second time interval. In one example, the at least one first cell and the at least one second cell belong to a BS of the network, or belong to different BSs of the network. In one example, the at least one first time interval is for performing at least one first UL transmission via a first RAT, and the at least one second time interval is for performing at least one second UL transmission via a second RAT.

Figure 5:
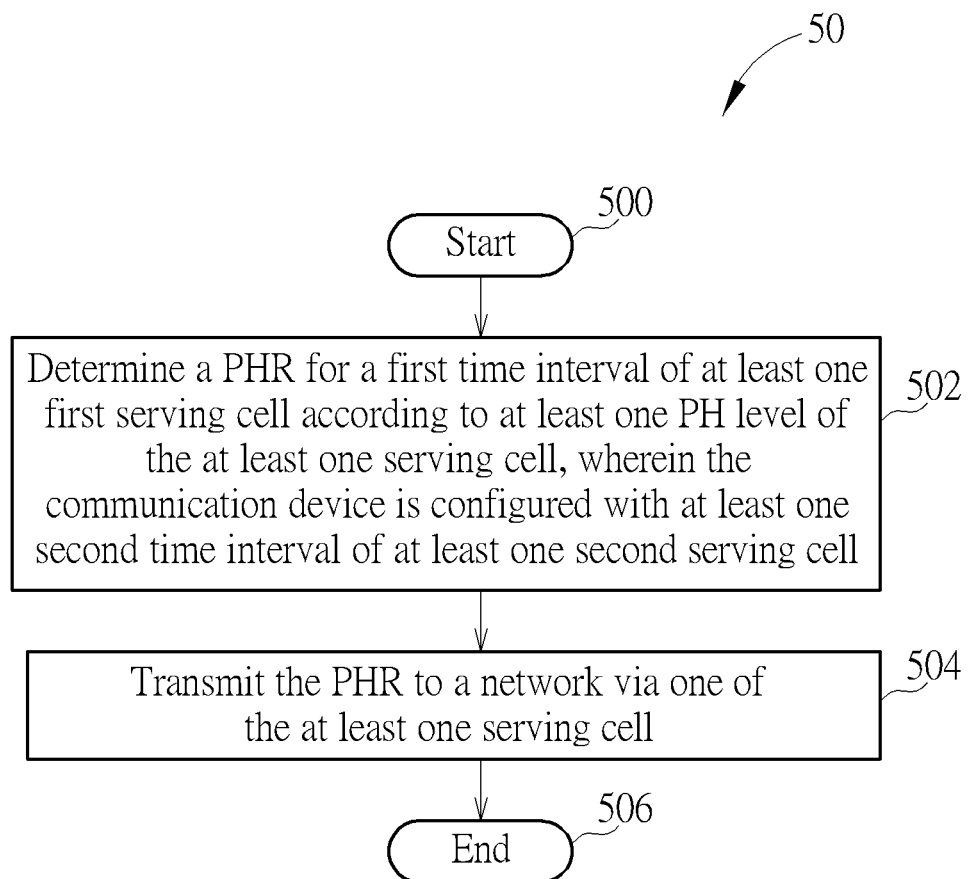
FIG. 5 is a flowchart of a process according to an example of the present invention.

FIG. 5 is a flowchart of a process 50 according to an example of the present invention. The process 50 may be utilized in a communication device shown in FIG. 1, to handle a PHR for multiple time intervals. The process 50 may be compiled into the program code 214 and includes the following steps:

Step 500: Start.

Step 502: Determine a PHR for a first time interval of at least one first serving cell according to at least one PH level of the at least one serving cell, wherein the communication device is configured with at least one second time interval of at least one second serving cell.

Step 504: Transmit the PHR to a network via one of the at least one serving cell.

Step 506: End.

According to the process 50, the communication device determines a PHR for a first time interval of at least one first serving cell according to at least one PH level of the at least one serving cell, wherein the communication device is configured with at least one second time interval of at least one second serving cell. Then, the communication device transmits the PHR to a network via one of the at least one serving cell. For example, the PHR includes the at least one PH level. That is, the PHR for the first time interval is transmitted, while at least one PHR for the at least one second timer interval is not processed.

Realization of the process 50 is not limited to the above description. The following examples may be applied for realizing the process 50.

In one example, the communication device transmits the PHR to the network via one of the at least one first serving cell. In one example, the communication device transmits the PHR and an index of the first time interval to the network. In one example, the first time interval is for performing at least one first UL transmission via the at least one serving cell, and the at least one second time interval are for performing at least second UL transmission via the at least one second cell. In one example, the first time interval is for performing at least one UL transmission via a first RAT, and the at least one second time interval is for performing at least second UL transmission via a second RAT. In one example, a length of the first time interval is different from each length of the at least one second time interval.

The following examples may be applied for realizing the process 30, 40 and/or 50.

It should be noted that lengths of the time intervals mentioned above are not limited. In one example, a length of the time interval is 0.5, 1, 2, 3, 4 transmission time interval(s) (TTI(s)). A TTI may be 1 ms or 2 ms, but is not limited herein. A PH level for a time interval (e.g., shortened time interval) may be (e.g., a function of) a difference between a power level of the time interval and a power level limit of a cell (e.g., serving cell) corresponding to the time interval. A time interval termed as a "scheduled" time interval means that a UL transmission may be performed in the time interval or that the time interval is scheduled by the network to be performed in the time interval. In one example, the communication device transmits a PHR according to a reporting periodicity which is communication device-specific, or according to a cell group of the PHR (e.g., time interval length group).

Figure 6:
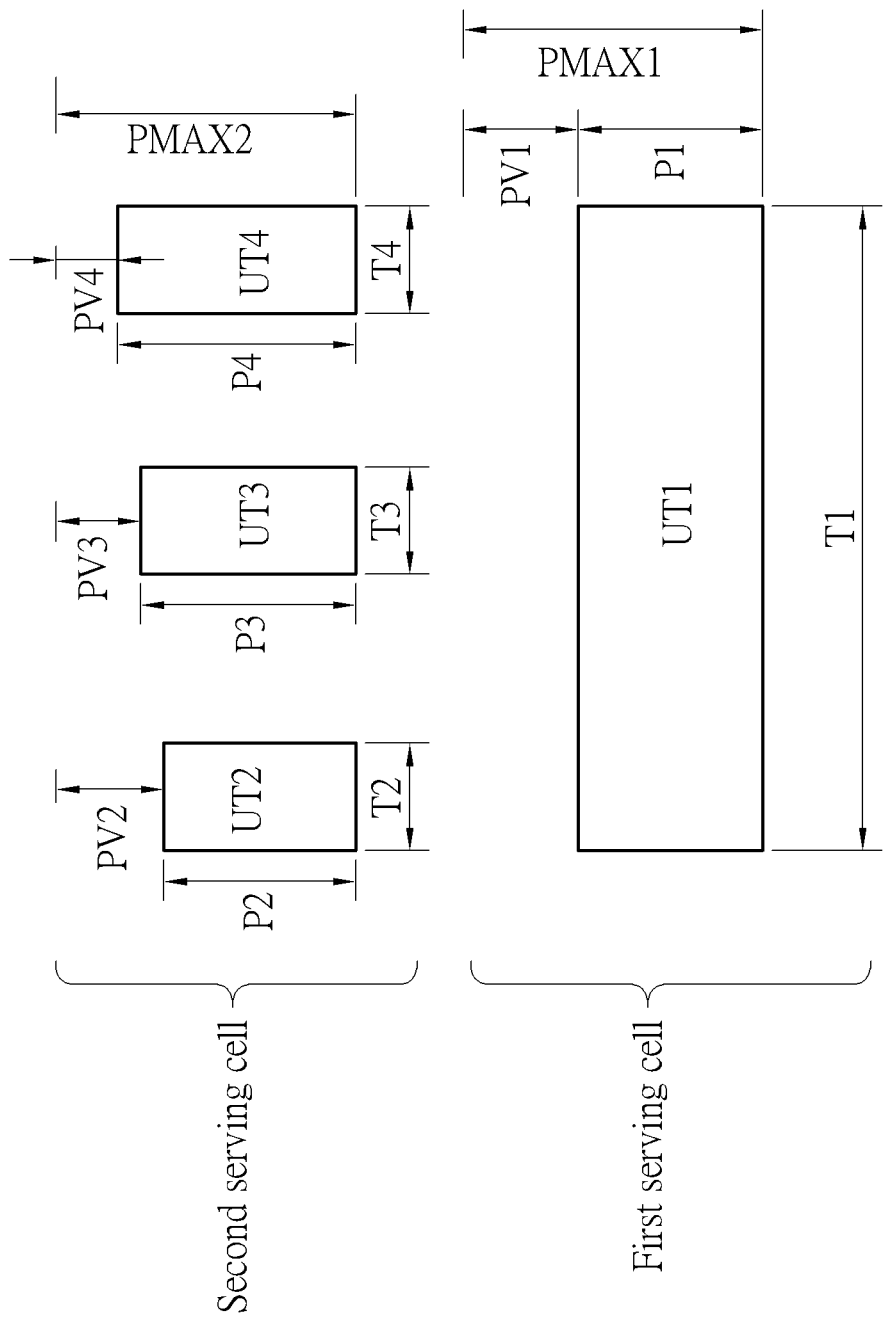
FIG. 6 is a schematic diagram of determining a PHR for multiple time intervals according to an example of the present invention.

FIG. 6 is a schematic diagram of determining a PHR for multiple time intervals according to an example of the present invention. Four UL transmissions UT1-UT4 with power levels P1-P4 (e.g., scheduled power levels or calculated/determined power levels) are considered. For example, the UL transmission UT1 includes a physical UL shared channel (PUSCH), and the UL transmissions UT2-UT4 include PUSCH(s) and/or physical UL control channel(s) (PUCCH(s)). The UL transmissions UT1-UT4 are performed in time intervals T1-T4, respectively, wherein the time intervals T2-T4 are shortened time intervals. The UL transmission UT1 may be performed with a first serving cell, and the UL transmissions UT2-UT4 may be performed with a second serving cell. In the present invention, power level limits PMAX1-PMAX2 are assumed for the time intervals T1 and T2-T4, respectively. Accordingly, PH levels PV1-PV4 for the time intervals T1-T4 can be determined, wherein PV1=PMAX1−P1, PV2=PMAX2−P2, PV3=PMAX2−P3 and PV4=PMAX2−P4 can be obtained. The relation between the PH levels PV2-PV4 may be PV2>PV3>PV4.

In one example, the communication device determines a PHR according to the PH level PV2 of the first time interval (e.g., the first scheduled time interval). In one example, the communication device determines a PHR according to the PH level PV4 of the last time interval (e.g., the last scheduled time interval). In one example, a predetermined time interval is the time interval T3, and the communication device determines a PHR according to the PH level PV3. In one example, the communication device determines a PHR according to the lowest PH level which is the PH level PV4. In one example, the communication device determines a PHR according to the highest PH level which is the PH level PV2.

In one example, the communication device determines a PHR according to an average of the PH levels PV2-PV4 which is (PV2+PV3+PV4)/3. In one example, only the time intervals T2 and T4 are scheduled for the communication device, while the time interval T3 is not (i.e., P3=0). The communication device may determine a PHR according to an average of the PH levels PV2 and PV4 which is (PV2+PV4)/3. That is, only the scheduled time intervals are considered. Alternatively, the communication device may still determine a PHR according to an average of the PH levels PV2-PV4 which is (PV2+PV3+PV4)/3. That is, the time interval T3 which is not scheduled is still considered.

Figure 7:
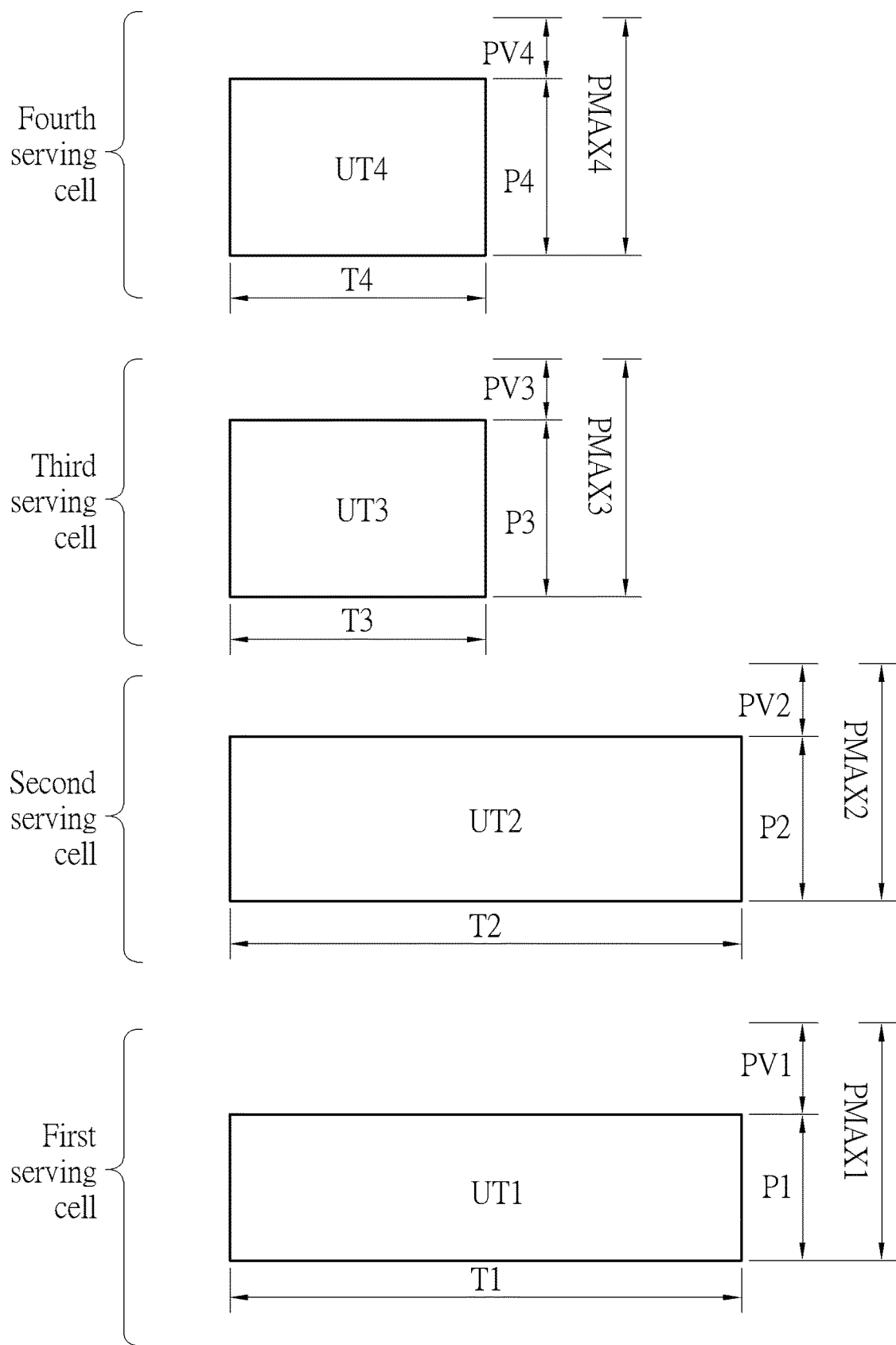
FIG. 7 is a schematic diagram of determining a PHR for multiple time intervals according to an example of the present invention.

FIG. 7 is a schematic diagram of determining a PHR for multiple time intervals according to an example of the present invention. Four UL transmissions UT1-UT4 with power levels P1-P4 (e.g., scheduled power levels or calculated/determined power levels) are considered. For example, each of the UL transmissions UT1-UT4 includes a PUSCH or a PUCCH. The UL transmissions UT1-UT4 are performed in time intervals T1-T4, respectively, wherein the time intervals T3-T4 are shortened time intervals. The UL transmissions UT1-UT4 may be performed with a first serving cell, a second serving cell, a third serving cell and a fourth serving cell, respectively. In the present invention, power level limits PMAX1-PMAX4 are assumed for the time intervals T1-T4, respectively. Accordingly, PH levels PV1-PV4 for the time intervals T1-T4 can be determined, wherein PV1=PMAX1−P1, PV2=PMAX2−P2, PV3=PMAX2−P3 and PV4=PMAX2−P4 can be obtained.

In one example, the PHR for the serving cells determined according the PH levels PV1-PV4 may be transmitted in a shorter time interval. For example, the PHR for all the serving cells may be transmitted via the time interval T3 or T4. In another example, the PHR may be transmitted according to cell groups determined according to lengths of the time intervals T1-T4. For example, the PHR for the first serving cell and the second serving cell may be transmitted in the time interval T1 (e.g., to the first serving cell) or the time interval T2 (e.g., to the first serving cell), because the lengths of the time intervals T1 and T2 are the same. In addition, the PHR for the third serving cell and the fourth serving cell may be transmitted in the time interval T3 (e.g., to the third serving cell) or the time interval T4 (e.g., to the fourth serving cell), because the lengths of the time intervals T3 and T4 are the same.

It should be noted that when the PHR is transmitted in a corresponding time interval (e.g., corresponding cell group), part of the PHR may be dropped. For example, part of the PHR for the first serving cell and the second serving cell (which is related to the PH levels PV1 and PV2) is transmitted, while part of the PHR for the third serving cell and the fourth serving cell (which is related to the PH levels PV3 and PV4) is dropped. That is, the PHR for the shortened time intervals are not transmitted.

In the above examples, a power level may mean transmission power or power related to a communication operation. A scheduled power level for a UL transmission may be any power level obtained prior to the execution of the processes 30 and 40, For example, the scheduled power level may be a power level scheduled (e.g., indicated) by the network, may be a power level predetermined in (e.g., calculated by) the communication device, and is not limited herein. "PH level" may be termed as "PH".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling a PHR for multiple time intervals. Thus, a communication device can transmit the PHR to a network. As a result, the network can schedule the communication device properly according to the PHR.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a power headroom report (PHR) for multiple transmission time intervals (TTIs), comprising:
    a storage device, for storing instructions of:
    determining a single PHR for a plurality of short TTIs in a long TTI according to a PH level of one of the plurality of short TTIs, wherein the plurality of short TTIs comprises at least one scheduled TTI; and
    transmitting the PHR to a network;
    wherein the long TTI is for performing at least one first UL transmission via a first cell, and the plurality of short TTIs are for performing a first plurality of UL transmissions via at least one second cell;
    wherein the plurality of short TTIs occur in the long TTI; and
    a processing circuit, coupled to the storage device, configured to execute the instructions stored in the storage device.

2. The communication device of claim 1, wherein the one of the plurality of short TTIs is a first scheduled TTI of the at least one scheduled TTI.

3. The communication device of claim 1, wherein the one of the plurality of short TTIs is predetermined in the communication device.

4. The communication device of claim 1, wherein the PHR is determined according to an average of at least one PH level of the at least one scheduled TTI.

5. The communication device of claim 1, wherein the communication device transmits the PHR and an index of the one of the plurality of short TTIs to the network.

6. The communication device of claim 1, wherein the communication device transmits the PHR in the long TTI to the network.

7. The communication device of claim 1, wherein the communication device transmits the PHR in one of the at least one scheduled TTI.

8. The communication device of claim 7, wherein a length of the one of the at least one scheduled TTI is shorter than at least one length of the rest of the at least one scheduled TTI.

9. The communication device of claim 1, wherein the at least one second cell belongs to at least one base station (BS) of the network.

10. The communication device of claim 1, wherein the long TTI is for performing at least one second UL transmission via a first radio access technology (RAT), and the plurality of short TTIs are for performing a second plurality of UL transmissions via a second RAT.

11. The communication device of claim 1, wherein a plurality of lengths of the plurality of short TTIs are the same.

12. The communication device of claim 1, wherein each of a plurality of lengths of the plurality of short TTIs are not greater than a half length of the long TTI.

13. A communication device for handling a power headroom report (PHR) for multiple transmission time intervals (TTIs), comprising:
    a storage device, for storing instructions of:
    determining a single first PHR for at least one first short TTI in a long TTI according to at least one first PH level of the at least one first short TTI, wherein the at least one first short TTI comprises at least one first scheduled TTI;
    determining a single second PHR for at least one second short TTI in the long TTI according to at least one second PH level of the at least one second short TTI, wherein the at least one second short TTI comprises at least one second scheduled TTI; and
    transmitting the first PHR and the second PHR to a network;
    wherein the at least one first short TTI and the at least one second short TTI occur in the long TTI; and
    a processing circuit, coupled to the storage device, configured to execute the instructions stored in the storage device.

14. The communication device of claim 13, wherein the communication device transmits the first PHR and the second PHR in one of the at least one first scheduled TTI to the network.

15. The communication device of claim 14, wherein a length of each of the at least one first short TTI is shorter than a length of each of the at least one second short TTI.

16. The communication device of claim 13, wherein the communication device transmits the first PHR in one of the at least one first scheduled TTI to the network, and transmits the second PHR in one of the at least one second scheduled TTI to the network.

17. The communication device of claim 13, wherein the at least one first short TTI is for performing at least one first UL transmission via at least one first cell, and the at least one second short TTI is for performing at least one second UL transmission via at least one second cell.

18. The communication device of claim 17, wherein the at least one first cell belongs to a first cell group according to at least one length of the at least one first short TTI, and the at least one second cell belongs to a second cell group according to at least one length of the at least one second short TTI.

19. The communication device of claim 17, wherein the at least one first cell and the at least one second cell belong to a cell group according to a plurality of lengths of the at least one first short TTI and the at least one second short TTI.

20. The communication device of claim 17, wherein the at least one first cell and the at least one second cell belong to a base station (BS) of the network, or belong to different BSs of the network.

21. The communication device of claim 13, wherein the at least one first short TTI is for performing at least one first UL transmission via a first radio access technology (RAT), and the at least one second short TTI is for performing at least one second UL transmission via a second RAT.

* * * * *